United States Patent [19]

Anastasia et al.

[11] 4,084,239
[45] Apr. 11, 1978

[54] PRECISION PRESSURE GENERATOR

[75] Inventors: Harry G. Anastasia, Hillsdale; Wallace D. Kineyko, Woodcliff Lake, both of N.J.; Carl H. Ludwig, Cornwall, N.Y.

[73] Assignee: The Bendix Corporation, Teterboro, N.J.

[21] Appl. No.: 743,210

[22] Filed: Nov. 18, 1976

[51] Int. Cl.² ............................................. G01L 27/00
[52] U.S. Cl. ................................... 364/424; 364/558; 364/571
[58] Field of Search .......................... 235/151.3, 150.2; 73/4 R; 137/86

[56] References Cited

U.S. PATENT DOCUMENTS

| 3,104,540 | 9/1963 | Vitale | 73/4 R |
|---|---|---|---|
| 3,106,084 | 10/1963 | Hoffman et al. | 73/4 R |
| 3,266,288 | 8/1966 | Andresen, Jr. et al. | 73/4 R |
| 3,446,948 | 5/1969 | Duck | 235/151.3 |
| 3,518,870 | 7/1970 | Shubert et al. | 73/4 R X |
| 3,548,632 | 12/1970 | Damrel, Jr. et al. | 73/4 R |
| 3,688,554 | 9/1972 | Kipnis et al. | 73/4 R |
| 3,689,748 | 9/1972 | Bothne | 235/151.3 |
| 3,699,989 | 10/1972 | O'Connor et al. | 137/86 X |
| 3,782,168 | 1/1974 | Wailes | 73/4 R |
| 3,992,926 | 11/1976 | Berryhill | 235/151.3 X |

Primary Examiner—Edward J. Wise
Attorney, Agent, or Firm—Anthony F. Cuoco

[57] ABSTRACT

Apparatus for rapidly generating highly accurate pressures for testing pressure responsive equipment such as may be used for aircraft control purposes. The apparatus may be used in an airborne mode or in a shop or repair depot. Highly accurate pressures are dependably and consistently provided for the aforenoted testing purposes by providing a system having interfacing digital, analog and pneumatic sections.

11 Claims, 4 Drawing Figures

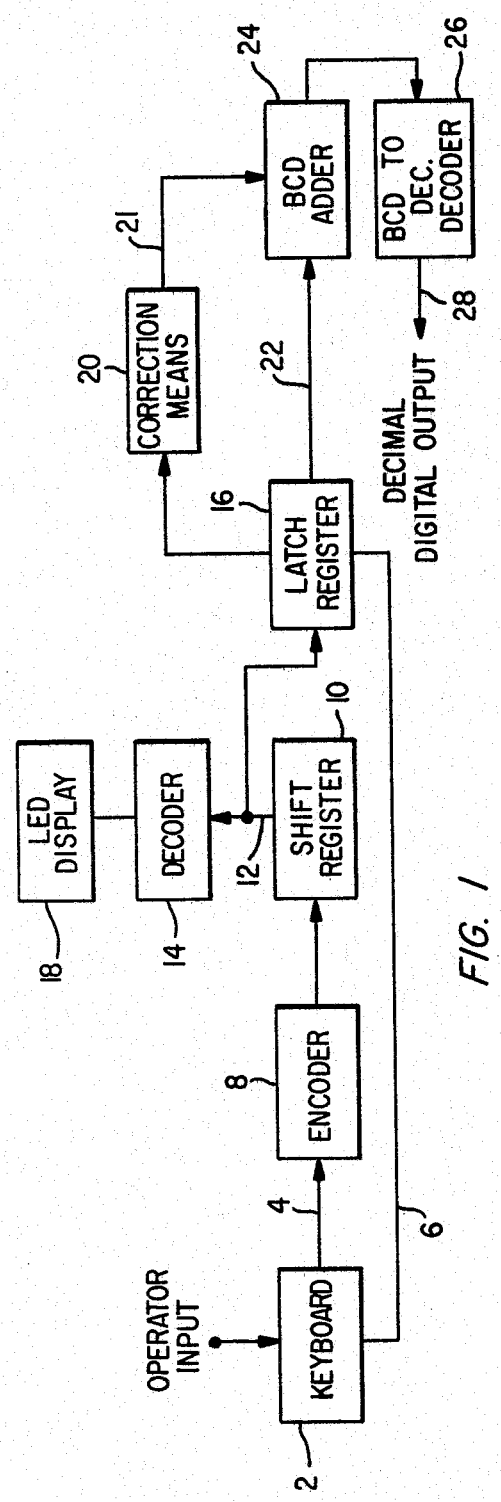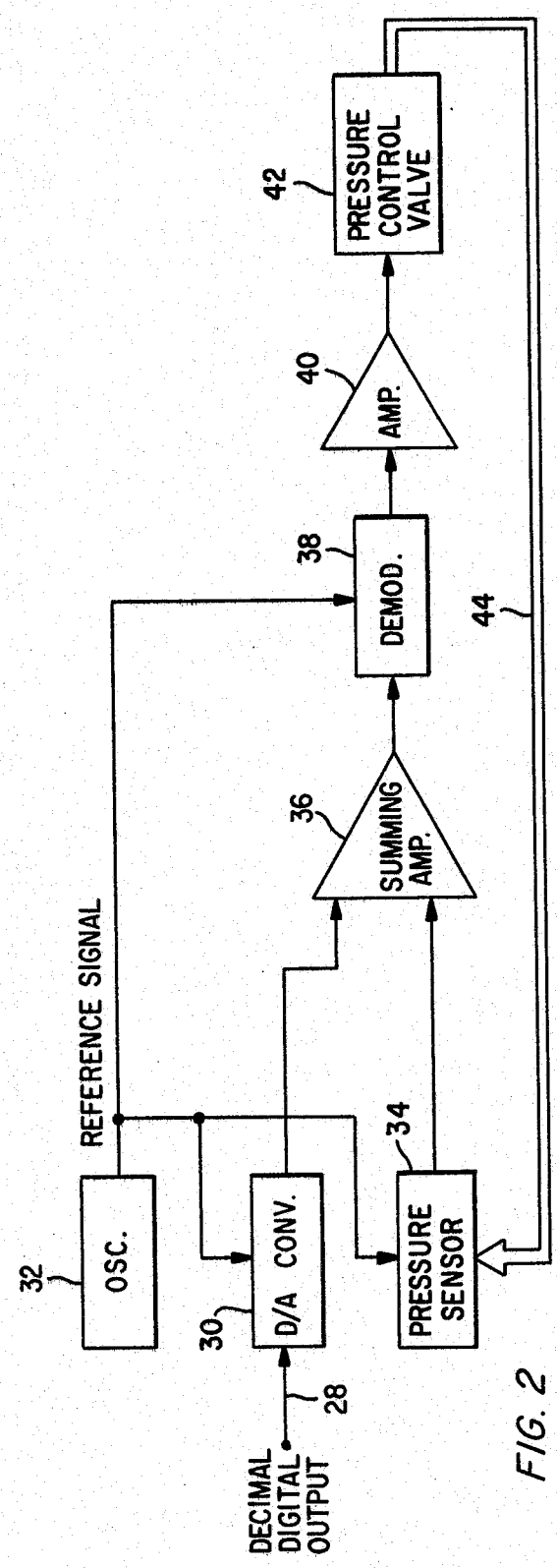

PRECISION PRESSURE GENERATOR

BACKGROUND OF THE INVENTION

1. Field of the Invention

This invention relates generally to pressure generators and particularly to pressure generators whereby a highly accurate pressure is generated for testing pressure responsive equipment. More particularly, this invention relates to a device of the type described which is portable and hence versatile in use.

2. Description of the Prior Art

Prior to the present invention, pressure responsive equipment such as air data equipment used in aircraft control system had to be tested either by removing the equipment from the aircraft to a shop or depot, or by connecting portable pressure generating equipment to the pitot-static probe of the aircraft while the craft was on the ground. Currently available portable pressure generating equipment does not generate pressure with sufficient accuracy to properly test equipment such as air data computers of the type used on modern aircraft. The present invention provides a highly accurate portable pressure generator for the purposes described, and which pressure generator may be built with standard components and at an economical cost for use in either airborne or ground based modes.

SUMMARY OF THE INVENTION

This invention contemplates apparatus of the type described including digital, analog and pneumatic sections. The digital section is used to initiate a pressure command, display the command through a light emitting diode arrangement, correct for system non-linearity and decode the command for digital to analog conversion. The analog section accepts the corrected, converted pressure command and converts the command to an analog, alternating signal. This signal is compared to the analog, alternating signal from a pressure sensor included in the equipment to be tested, and a difference signal is thereby provided which is converted to a constant level signal through a demodulator. The constant level signal is used to drive a pressure control valve in the pneumatic section of the system. The control valve responds to the driving signal so that the pressure sensor signal matches the command signal whereupon the system is at null.

The pneumatic section includes the aforenoted control valve and pressure and vacuum sources of moderate capacity. The pressure input from the pressure source is filtered and regulated to maintain the pressure input to the control valve at a predetermined level above the valve output. The valve output, which is a highly accurate pressure output, is manifolded to safety and isolation valves and directed to a system output receptacle for utilization as the case may be.

One object of this invention is to provide a portable pressure generator for generating an accurate pressure for testing pressure responsive equipment.

Another object of this invention is to provide a pressure generator of the type described which generates the pressure with a degree of accuracy not heretofore obtainable.

Another object of this invention is to interface digital, analog and pneumatic equipment to provide a pressure generator of the type described.

Another object of this invention is to provide equipment of the type described which is suitable for airborne or ground based testing of air data equipment used in modern aircraft.

The foregoing and other objects and advantages of the invention will appear more fully hereinafter from a consideration of the detailed description which follows, taken together with the accompanying drawings wherein a single embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is a block diagram of a digital section of a pressure generator constructed in accordance with the invention.

FIG. 2 is a block diagram of an analog section of the pressure generator.

DESCRIPTION OF THE INVENTION

Figure 3:
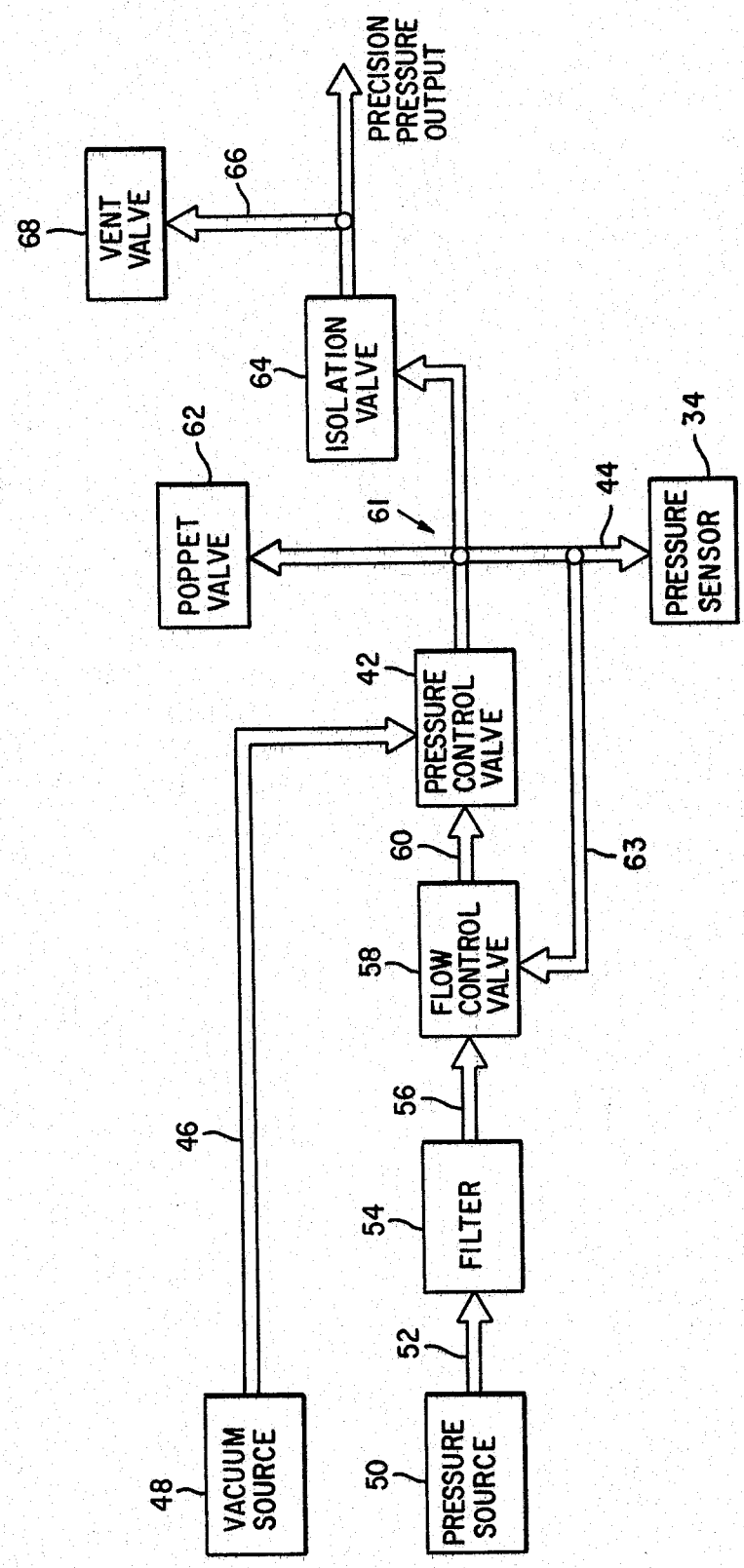
FIG. 3 is a block diagram of a pneumatic section of the pressure generator.

With reference first to FIG. 1, a pressure command is initiated by an operator input to a keyboard 2. Keyboard 2 provides a binary coded decimal (BCD) output at an output conductor 4 and a BCD output at an output conductor 6.

The output at conductor 4 is applied to an encoder 8 and therefrom to a shift register 10. Shift register 10 provides an output at an output conductor 12, and which output is applied to a decoder 14 and to a latch register 16. Decoder 14 decodes the output from shift register 10, and which decoded output actuates light emitting diode (LED) display 18 for displaying the operator initiated pressure command.

The output from shift register 10 is applied to latch register 16 as heretofore noted. A portion of the output from latch register 16 is applied to a correction means 20 upon the latch register receiving an entry pulse from keyboard 2 through conductor 6. Correction means 20, shown generally in FIG. 1, is shown in substantial detail in FIG. 4 and the operation thereof will be described with reference to said Figure. It will suffice to say for present purposes, that correction means 20 corrects for system non-linearity and provides a correction signal at an output conductor 21.

The correction signal from correction means 20 at output conductor 21 and the output from latch register 16 at an output conductor 22 are applied to a BCD adder 24 and added thereby. The added output is applied to a BCD to decimal decoder 26 which provides a decimal digital output at an output conductor 28.

It will be understood that the various components illustrated in FIG. 1 are standard components and the novelty of the invention is not in the components themselves, but in the unique arrangement thereof. Thus keyboard 2 is a commercially available computer type keyboard as is LED display 18 a commercially available type display, while encoder 8 may be a binary coded decimal (BCD) encoder such as described in the text, *Pulse, Digital and Switching Waveforms* by Millman and Taub, published by the McGraw Hill Book Company in 1965. Likewise, registers 10 and 16 may be of the type described at Pages 343 to 349 of Millman and Taub, Supra, while decoders 14 and 26 may be such as described at Pages 350 and 351 thereof. Adder 24 may be of the type generally described at Pages 338 to 341 of the the referenced text.

With reference now, to FIG. 2, the decimal digital output at output conductor 28 of decoder 26 shown in FIG. 1, and which output is actually a corrected pressure command, is applied to a digital-to-analog converter 30. A conventional type oscillator 32 provides a reference signal, and which reference signal may be for purposes of illustration, a 3KHz alternating signal. The reference signal from oscillator 32 is applied to digital-to-analog converter 30, to a pressure sensor 34 and to a conventional demodulator 38.

Pressure sensor 34 may be of the type included in airborne air data equipment. Pressure sensor 34 may be, for purposes of illustration, of the type described in U.S. Pat. No. 3,645,137 issued on Feb. 29, 1972 to Edward J. Hazen and assigned to The Bendix Corporation, Assignee of the present invention.

The reference signal from oscillator 32 provides a voltage reference for converter 30 and for pressure sensor 34. The converter converts the decimal digital output at conductor 28 to an analog alternating signal and the pressure sensor provides an analog alternating signal corresponding to sensed pressure.

The signal from converter 30 and the signal from pressure sensor 34 are applied to a conventional type summing amplifier 36 which sums the applied signals and provides an alternating difference signal at its output. Demodulator 38 is triggered by the reference signal from oscillator 34 to provide a constant level or d.c. signal at its output.

The constant level signal from demodulator 38 is amplified by an amplifier 40, and the amplified signal is applied to a pressure control valve 42. Pressure control valve 42 is of the pneumatic type including a torque motor having a drive coil, and which torque motor is connected through a suitable pneumatic coupling 44 to pressure sensor 34. Pressure control valve 42 responds to the demodulated, amplified error signal from amplifier 40 to drive pressure sensor 34 so that the output of the pressure sensor equals the corrected pressure command at conductor 28 whereby the system is in a null condition.

With reference now to FIG. 3, pressure control valve 42 is coupled through suitable pneumatic means 46 to a moderate capacity vacuum source 48. A moderate capacity pressure source 50 is coupled through suitable pneumatic means 52 to a conventional microporous filter 54 and therefrom through suitable pneumatic means 56 to a flow control valve 58. Flow control valve 58 regulates the filtered pressure so that the pressure input to pressure control valve 42 through suitable pneumatic coupling means 60 is maintained at a level which may be, for purposes of example, 6 psi above the output of control valve 42.

The regulated output from control valve 42 is fed back through suitable pneumatic coupling means 63 to flow control valve 58 and is manifolded through suitable pneumatic manifolding means 61 to a safety poppet valve 62, and to an isolation valve 64, and through coupling 44 to sensor 34. The output from isolation valve 64 is applied through suitable pneumatic coupling means 66 to a vent valve 68, and which output represents a precision pressure as is required for purposes of the invention as aforenoted. The precision pressure output is then applied to a system output receptacle, (not shown) as may be required for the particular application involved.

Figure 4:
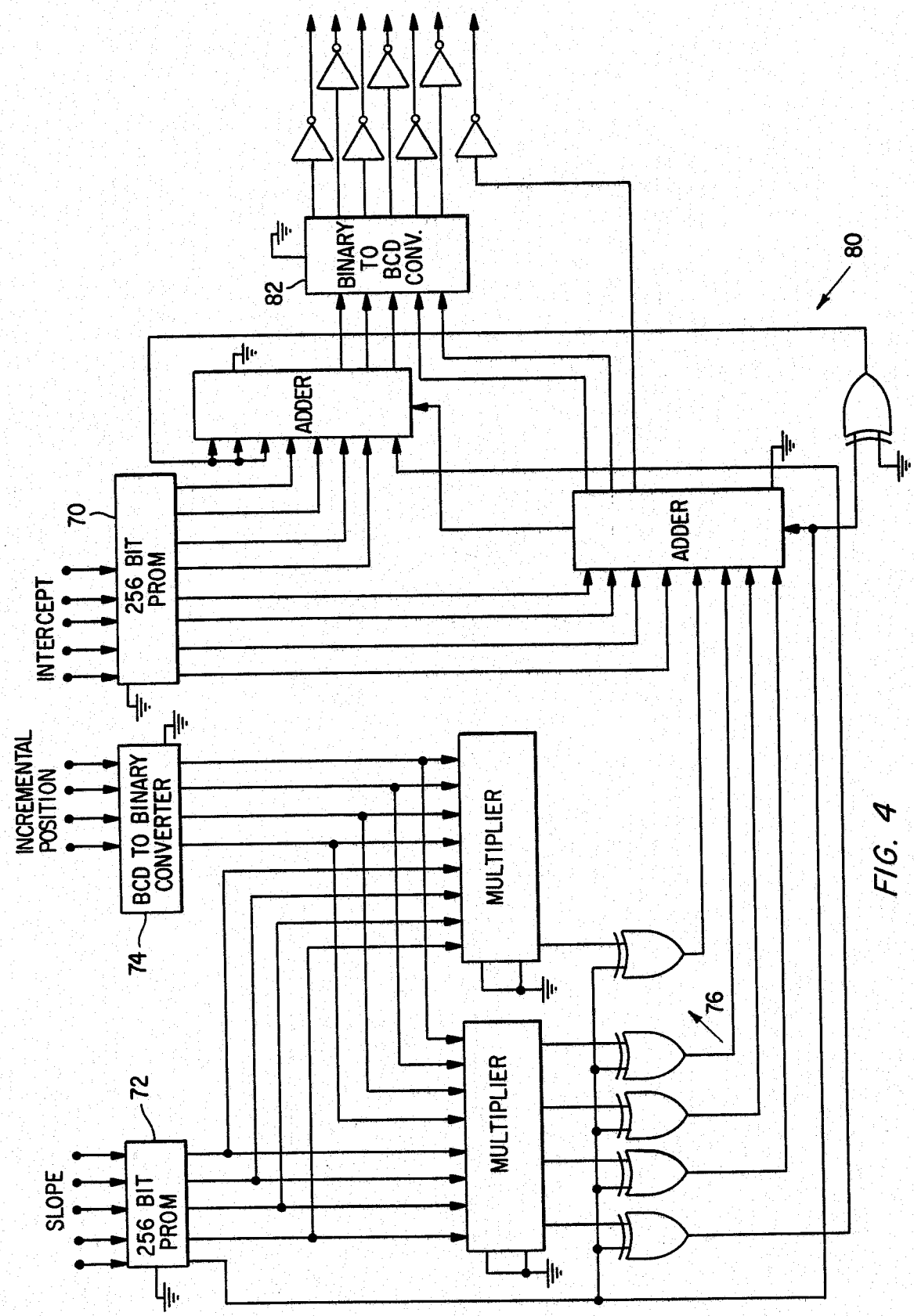
FIG. 4 is an electrical schematic diagram illustrating command pressure correction means illustrated generally in FIG. 1 and constructed in accordance with the invention.

As heretofore described with reference to FIG. 1, a portion of the output from latch register 16 is applied to correction means 20 upon the latch register receiving the entry pulse from keyboard 2 through conductor 6. Generally, the purpose of correction means 20 is to correct for system nonlinearity and to provide a correction signal at output conductor 21 as shown in FIG. 1. FIG. 4 shows correction means 20 in substantial detail and which correction means will now be described with reference to said Figure.

A 256 bit intercept correction Programmed Read Only memory (PROM) designated by the numeral 70 receives that portion of the binary coded decimal pressure command from latch register 16 (FIG. 1) that defines discrete equal segments over the system pressure range (2 inch Hg. segments over 40 inch Hg. range). PROM 70 is programmed from uncorrected system calibration data to output a prescribed binary correction for each segment, which in effect sequentially truncates an "error from absolute" curve of the commanded pressure.

A second tier correction is provided which reduces the aforenoted absolute error still further by utilizing a second 256 bit slope correction PROM 72. PROM 72 is addressed by that same portion of the BCD pressure command as is intercept PROM 70. Slope correction PROM 72, also programmed from uncorrected system calibration data, outputs a binary slope factor (inches Hg. per inch Hg.) for each intercept correction segment.

The output from slope PROM 72, which is a binary output, and an incremental address provided by a BCD to binary converter 74 generated from that portion of the BCD pressure command from latch register 16 which defines discrete equal segments within each intercept correction segment are applied to multiplier means 76. The output of multiplier means 76 is a binary slope correction which effects a second order truncation of the "error from absolute" curve heretofore noted.

An adder means 80 adds the outputs from slope multiplier means 76 and from intercept PROM 70, which outputs are actually slope and intercept corrections, and the sum thereof in binary form is converted to binary coded decimal form by binary to BCD converter 82. The converted output appears at output conductor 21 (FIG. 1) where it is added by BCD adder 24 with the output of latch register 16 at output conductor 22 thereof as heretofore noted.

As heretofore noted, correction means 20, shown generally in FIG. 1 and more specifically in FIG. 4, includes PROM's 70 and 72 and corrects for system non-linearity by providing a correction signal as illustrated in FIG. 1. The PROM's are programmed from uncorrected system calibration data to output a prescribed binary correction for each segment of the pressure command from latch register 16 as earlier described.

For purposes of illustration, PROM 72 receives that portion of the latch register command represented by five bits as shown in FIG. 4. When the received logic is at "zero" the bit values are 0 in. Hg. and when the received logic is at "one," the bit values, from left to right, are at 32, 16, 8, 4 and 2 in. Hg., respectively. This, in effect, locates the pressure that the system is presently operating at within the system pressure range. At this present pressure location a defined pressure correction has to be applied for the purposes aforenoted.

Based on data from the system operating uncorrected as compared to absolute pressure, system errors can be measured and error slopes calculated for the several commanded pressures as follows:

| Commanded Pressure (in. Hg.) | Measured Uncorrected System Error (in. Hg. × 10$^{-3}$) | Calculated Error Slope (in. Hg. × 10$^{-3}$ per in. Hg.) |
|---|---|---|
| 0 | 8.0 | 9.7 − 8.0 ÷ 2 = .85 |
| 2 | 9.7 | 12.3 − 9.7 ÷ 2 = 1.3 |
| 4 | 12.3 | • |
| • | • | • |
| • | • | • |
| • | • | • |

PROM 72 has five output bits as shown in FIG. 4, each having values selected to optimize an expected correction range. For example, when the outputs are at logic "1" the output bit values, from left to right, are + (indicating the direction of error slope) and 2.4, 1.2, 0.6 and 0.3 in. Hg. × 10$^{-3}$ per in. Hg., respectively. When the outputs are at logic "0" the bit values, from left to right, are − (indicating the direction of error slope) and 0, 0, 0 and 0 in. Hg. × 10$^{-3}$ per in. Hg., respectively.

Thus, from the aforegoing it will be seen, for purposes of illustration, that when the pressure command is between 0 and 2 in. Hg., an error slope correction of + 0.85 in. Hg. × 10$^{-3}$ per in. Hg. is programmed into PROM 72 so that the PROM outputs logic at its five output bits, from left to right, of "1," "0," "0," 1" and "1," respectively. This defines a correction of 0.6 + 0.3 = 0.90 in. Hg. × 10$^{-3}$ per in. Hg., with a positive slope. This approximates the calculated error slope of 0.85 in. Hg. × 10$^{-3}$ per in. Hg.

It will now be understood by those skilled in the art that in a like manner PROM 70 is programmed from uncorrected system calibration data to output a prescribed binary correction for each segment of the pressure command from latch register 16 for the purposes earlier described.

OPERATION OF THE INVENTION

In accordance with the invention as described with reference to FIGS. 1, 2, 3 and 4, it will now be understood that pressure is commanded by a keyboard entry. The pressure command is processed through the digital section of the system of the invention as illustrated in FIG. 1 to provide a decimal digital output corresponding to the commanded pressure corrected for system non-linearity.

The analog section of the system, as shown in FIG. 2, compares the decimal digital output to the output of a pressure sensor, and a difference signal thereupon provided actuates a pressure control valve. The pressure control valve is pneumatically connected to the pressure sensor to equalize the actual and commanded pressures.

The precision pressure output is provided as described with reference to FIG. 3, wherein the pressure control valve is responsive to a differential pressure provided by a suitable vacuum source and a filtered pressure from a pressure source which is regulated to a predetermined limit above that of the pressure control valve.

Programmable Read Only Memory (PROM) Means as specifically illustrated in FIG. 4 processes the commanded pressure for correction of pressure sensor non-linearity as aforenoted. Desirable features incorporated into the system include a light emitting diode (LED) display of the commanded pressure (FIG. 1) and venting and isolating means (FIG. 2).

Thus in accordance with the above, a portable precision pressure generator incorporating the aforementioned digital, analog and pneumatic sections has been provided. The pressure sensor so provided is a distinct improvement over the prior art in that it provides highly accurate, dependable and consistent pressures in portable apparatus such as may be used in shop or airborne modes.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A system for providing a precision pressure output, comprising:
   means for providing a pressure command signal including means for correcting the command signal for non-linearity;
   a pressure sensor for providing a signal corresponding to sensed pressure;
   means for combining the corrected command signal and the pressure sensor signal and for providing a difference signal;
   means for providing a pressure input;
   a pressure control valve connected to the pressure input means and receiving the pressure input therefrom;
   the pressure control valve connected to the combining means and responsive to the difference signal therefrom for providing a pressure output; and
   means for feeding back the pressure output to the pressure sensor so that the signal from the pressure sensor equals the corrected pressure command signal and the system is at null, whereupon the precision pressure is provided.

2. A system as described by claim 1, wherein the means for providing a pressure command signal including means for correcting the command signal for non-linearity includes:
   operator-operated keyboard means for providing a binary coded decimal pressure command signal and a binary coded decimal entry signal;
   an encoder for encoding the command signal;
   shift register means for shifting and registering the encoded command signal;
   latch register means for latching and registering the shifted and registered encoded command signal;
   correction means;
   the latch register means connected to the keyboard means and to the correction means and responsive to the entry signal for applying a portion of the shifted and registered and latched and registered encoded command signal to the correction means, whereupon said correction means provides a correction signal for correcting the command signal non-linearity;
   means for combining the correction signal and a portion of the shifted and registered and latched and registered encoded command signal to provide a binary coded decimal combined signal; and means for decoding the binary coded decimal combined signal to provide a corrected decimal digital output pressure command signal.

3. A system as described by claim 2, wherein the means for combining the correction signal and a portion of the shifted and registered and latched and registered encoded command signal to provide a binary code decimal digital output pressure command signal includes:
means for adding the correction signal and the portion of the shifted and registered and latched and registered encoded command signal.

4. A system as described by claim 2, wherein the correction means includes:
first means connected to the latch register and responsive to the portion of the shifted and registered and latched and registered encoded command signal therefrom that defines discrete equal segments over a predetermined pressure range for providing predetermined binary intercept correction outputs for each segment, which outputs sequentially truncate an "error from absolute" curve of the command signal;
second means connected to the latch register and addressed by the portion of the shifted and registered and latched and registered encoded command signal therefrom that defines discrete equal segments over a predetermined pressure range for providing predetermind binary slope correction outputs for each intercept correction output, which further truncate the "error from absolute" curve of the command signal;
third means connected to the latch register and responsive to that portion of the shifted and registered and latched and registered encoded command signal which defines discrete equal segments within each intercept correction segment for generating incremental address outputs;
means for combining the correction outputs from the second means and the address outputs from the third means; and
other means for combining the output from the first mentioned combining means and the correction outputs from the first means to provide the correction signal.

5. A system as described by claim 4 wherein the first mentioned combining means includes:
multiplier means for multiplying the correction outputs from the second means and the address outputs from the third means to provide a further higher order truncation of the "error from absolute" curve of the command signal.

6. A system as described by claim 4, wherein the other combining means includes:
adder means for adding the outputs from the first mentioned combining means and the correction outputs from the first means to provide the correction signal.

7. A system as described in claim 1, wherein:
the pressure sensor signal is an analog signal;
the corrected pressure command signal is a digital signal; and
the means for combining the pressure sensor signal and the corrected command signal includes means for converting the corrected command signal to an analog signal and means for summing the analog pressure sensor signal and the analog corrected command signal for providing a summation signal.

8. A system as described by claim 7, including:
an oscillator for providing an alternating reference signal at a predetermined frequency;
the oscillator connected to the converting means and to the pressure sensor for applying the alternating reference signal thereto, whereupon the analog corrected command signal, the analog pressure sensor signal and the summation signal are alternating signals; and
a demodulator connected to the oscillator and to the summing means, and triggered by the alternating reference signal to demodulate the alternating summation signal and to provide a constant level summation signal.

9. A system as described by claim 8, wherein:
the means for providing a pressure input includes a vacuum source, a pressure source, a filter connected to the pressure source for filtering the pressure therefrom and a flow control valve connected to the filter for controlling the flow of filtered pressure; and
the pressure control means coupled to the vacuum source and to the flow control valve and responsive to the vacuum from the vacuum source and the controlled flow of filtered pressure from the flow control valve for receiving the pressure input, and connected to the demodulator and responsive to the constant level summation signal for providing the pressure output.

10. A system as described by claim 9, wherein:
the pressure control valve is coupled to the pressure sensor for feeding back the pressure output thereto so that the system is at null whereupon the precision pressure is generated.

11. A system as described by claim 1, including:
a decoder connected to the shift register for decoding the shifted and registered encoded command signal; and
display means connected to the decoder for displaying the pressure command.

* * * * *